United States Patent [19]
Cox

[11] 3,937,338
[45] Feb. 10, 1976

[54] MULTI-PURPOSE VEHICLE FOR HAULING BULK MATERIAL OR DISCRETE PACKAGES

[76] Inventor: Joe L. Cox, 1096 E. First St., Pomona, Calif. 91766

[22] Filed: June 25, 1973

[21] Appl. No.: 373,368

[52] U.S. Cl. ............. 214/83.36; 198/203; 198/204
[51] Int. Cl.² ........................................ B60P 1/38
[58] Field of Search ......... 214/83.36; 198/193, 204, 198/DIG. 7, 203, 208, 233

[56] References Cited
UNITED STATES PATENTS

| | | | |
|---|---|---|---|
| 1,289,513 | 12/1918 | Mott | 214/83.36 |
| 1,497,622 | 6/1924 | Weber | 214/83.36 |
| 2,916,169 | 12/1959 | DeWitt | 214/83.36 |
| 3,000,521 | 9/1961 | Deputy | 214/83.36 |
| 3,265,192 | 8/1966 | Stadelman | 198/204 |
| 3,482,717 | 1/1970 | Moser | 214/83.36 |
| 3,498,486 | 3/1970 | Freeman, Jr. | 214/83.36 |
| 3,593,864 | 7/1971 | Moser | 214/83.36 |

FOREIGN PATENTS OR APPLICATIONS

| | | | |
|---|---|---|---|
| 369,383 | 3/1932 | United Kingdom | 198/203 |

Primary Examiner—Robert J. Spar
Assistant Examiner—Donald W. Underwood
Attorney, Agent, or Firm—Poms, Smith, Lande & Glenny

[57] ABSTRACT

A multi-purpose vehicle for transporting material in bulk form such as trash, waste, and rubble or in packaged form such as, boxes, containers, pallet loads, and the like. An elongated walled vehicle body having a floor, an anti-friction surface on the floor, and twin side by side endless belts of reinforced neoprene, each having a top lay movable under load along said anti-friction surface and a bottom lay extending beneath the floor in engagement with a plurality of drive rollers. The drive rollers include two horizontally spaced rollers and a third roller spaced below and between the two rollers, the horizontally spaced rollers being spaced apart less than the diameter of the third roller therebeneath. A motor means carried beneath the floor drives through a common drive portion the set of three drive rollers for each belt.

4 Claims, 6 Drawing Figures

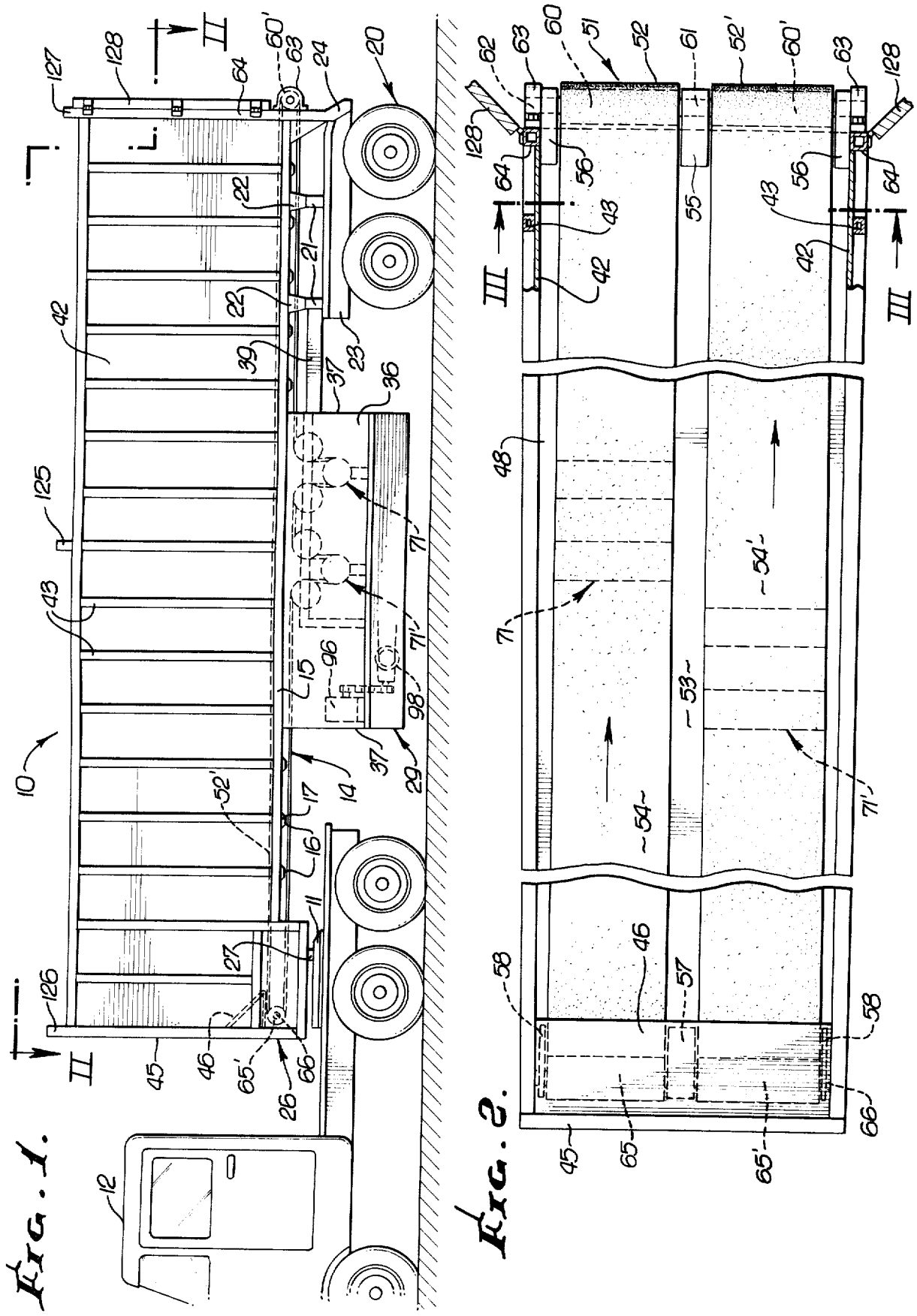

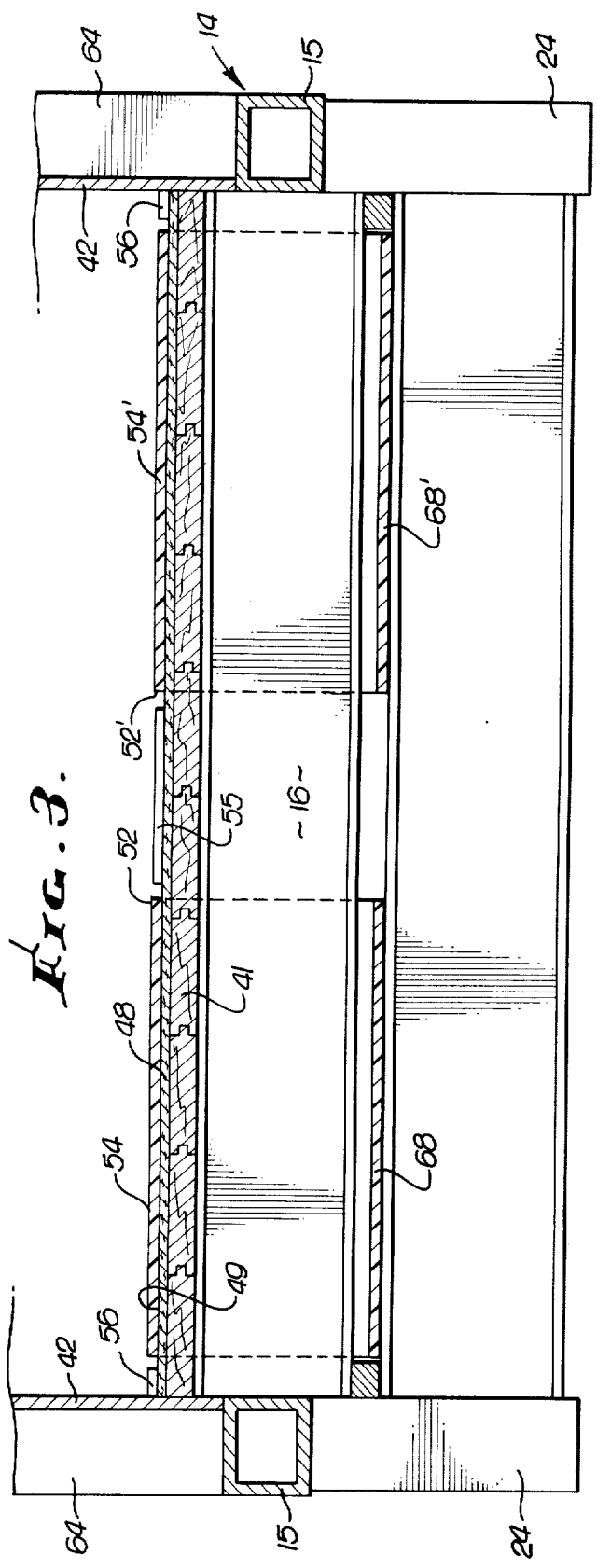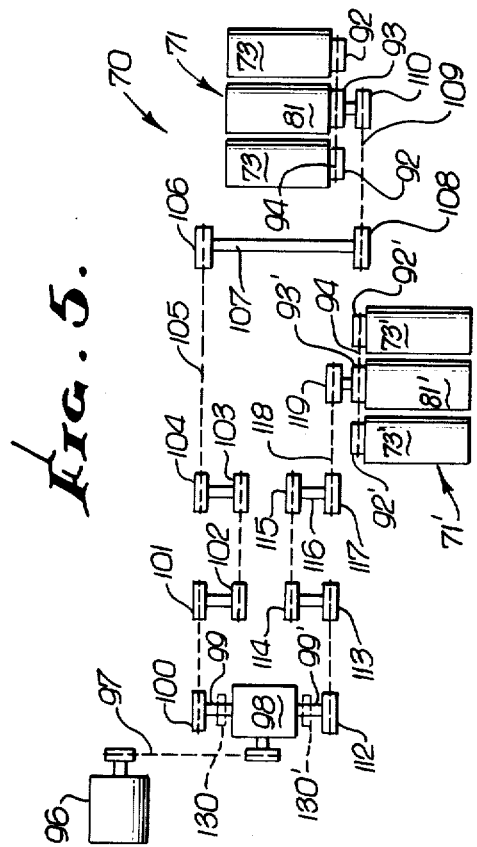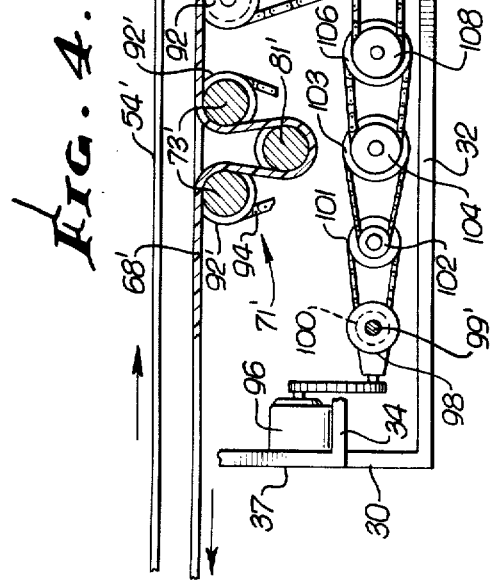

3,937,338

MULTI-PURPOSE VEHICLE FOR HAULING BULK MATERIAL OR DISCRETE PACKAGES

BACKGROUND OF INVENTION

Disposal of heterogeneous solid wastes often requires the collection of such waste material at a collection point and then transportation of the waste material to a permanent remote disposal site. Such heterogeneous solid waste includes trash, rubble, and a multitude of different types of material of different size, shape and density. Such waste material from large urban areas is often collected at dump sites from which the waste material is loaded by bulldozers or clam buckets into tractor-trailer type vehicles for hauling to permanent disposal sites located in areas remote from such urban centers.

Prior proposed vehicle bodies for hauling such waste material have included truck bodies capable of being tilted to a sufficient angle so that trash carried thereby will move by gravity off the discharge end of the body. Since such discharge often occurs in non-stable soil areas, the tilting of the loaded truck body with a settling of one side of the vehicle results in overturning of the vehicle before the load is discharged. Thus such types of waste carrying vehicles require pre-conditioning of the soil at the truck dumping area. Another type of prior proposed waste hauling vehicle body has included a movable slat-type endless belt having a top lay above the floor of the vehicle body and upon which the trash is loaded and then moved off the end of the vehicle body by moving the slat-type endless belt. The slat-type endless belt construction required some separation between the slats at the discharge end of the vehicle body and where the slats moved in an arcuate path for return movement to the front of the vehicle body. Separation of the slats at the discharge point permitted trash elements to fall between such slats thereby causing interference with the operation of the slat-type endless belt. Cleaning and maintenance of such a type of vehicle body was time consuming, difficult and resulted in excessive "deadhead" or down time for the vehicle.

In another prior proposed trash hauling vehicle, a vehicle body was provided with a floor over which passed the top lay of an endless belt of continuous material. (U.S. Pat. No. 3,482,717). Such prior proposed endless belt was driven by an end roller at one end of the vehicle body. An improvement of this endless belt arrangement included the provision of a second endless belt beneath the top lay of the first belt to provide sufficient power to move the belt when under load (U.S. Pat. No. 3,593,864).

In another prior proposed construction of such a trash hauling vehicle body, the top lay of an endless belt was supported on a plurality of closely spaced rolls. (U.S. Pat. No. 3,247,983).

Since the waste material loaded and hauled in such vehicle bodies includes a random mixture of many different types of elements and material and since heavy loads in the nature of 40,000 pounds per load are required to make such hauling economically feasible, such prior proposed trash hauling vehicles were not wholly satisfactory. It is desirable that a trash hauling vehicle be capable of being readily loaded, the load should be a maximum load in the order of 40,000 pounds depending upon governmental highway load restrictions, and that such a maximum heay load be capable of discharge from the vehicle body without overturning of the vehicle. It is also desirable that the interior of the vehicle body be capable of being readily cleaned and flushed with fluid under pressure such as water or steam and that the means for moving the trash from the vehicle body be free from entanglement with trash particles which might render the trash moving means inoperative.

SUMMARY OF INVENTION

This invention relates to a novel construction of a trash hauling vehicle body which achieves the objectives mentioned above and which avoids the disadvantages of the prior proposed trash hauling vehicle bodies. The invention contemplates a trash hauling vehicle body having an extremely clean non-interfering trash hauling compartment arranged to be readily loaded and to discharge a trash load therein relatively rapidly and uniformly.

The main object of the present invention therefore, is to provide a novel multi-purpose vehicle primarily capable of effectively hauling heterogeneous solid waste materials or discrete packaged material if desired.

An object of the invention is to provide a trash hauling vehicle body having means for moving the trash therein and constructed in such a manner that its operability is relatively unaffected by the type of trash material being hauled.

Another object of the present invention is to provide a trash hauling vehicle in which novel drive means are provided for moving an endless belt means along the floor of the vehicle body.

Another object of the present invention is to provide a trash hauling vehicle body in which the top lay of an endless belt means is supported on anti-friction material so that under load a relatively small motor means may be used to drive the endless belt means.

A further object of the present invention is to provide a waste hauling vehicle body having twin or side by side endless belt means each having a top lay over the floor of the body and a bottom lay beneath the floor of the body.

A still further object of the present invention is to provide a trash hauling vehicle body including a novel frame structure supporting the vehicle body adapted to withstand compressive forces during operation which might result in buckling of the vehicle frame structure caused by moving such heavy loads.

A still further object of the invention is to provide a vehicle body adapted to haul either trash or packaged products in which twin endless belt means are operable either separately or in unison through a common drive means.

Another object of the present invention is to provide a novel drive means for such twin endless belt means.

Other objects and advantages of the present invention will be readily apparent from the following description of the drawings in which an example of the invention is shown.

IN THE DRAWINGS

FIG. 1 is a side elevational view of a vehicle embodying the present invention.

FIG. 2 is a slightly enlarged plan view of the vehicle body shown in FIG. 1, the view partly in section and taken along the horizontal transverse planes indicated by line II—II of FIG. 1.

FIG. 3 is a vertical transverse sectional view taken in the plane indicated by line III—III of FIG. 2.

FIG. 4 is a fragmentary elevational view of drive means shown in FIG. 1, the cover for said drive means being removed.

FIG. 5 is a schematic view of the drive system for the endless belt means shown in FIG. 1.

Figure 6:
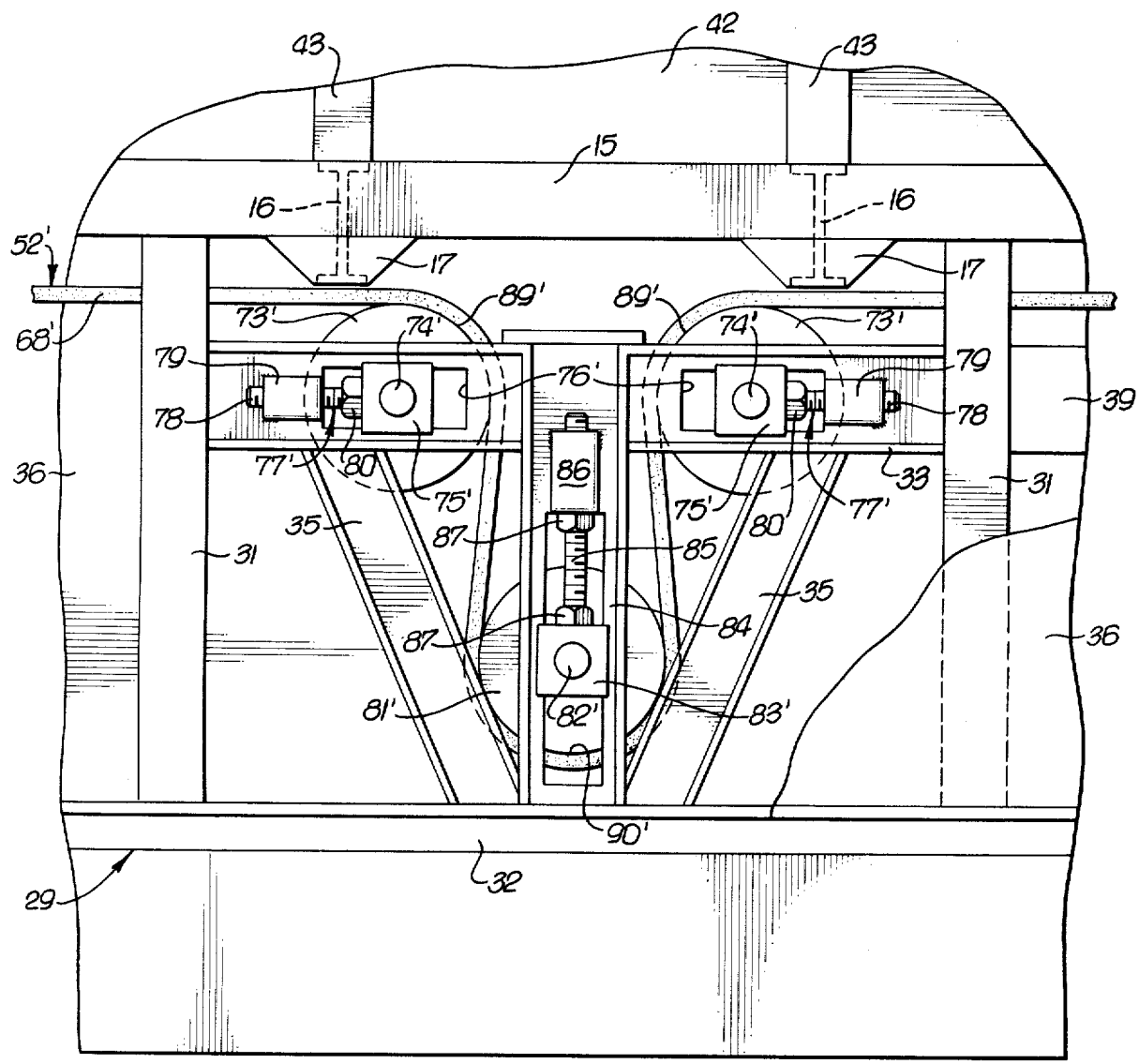
FIG. 6 is an enlarged fragmentary side view of drive means for one of the endless belts.

In FIG. 1 there is shown a tractor-trailer combination including a trailer vehicle body generally indicated at 10 embodying this invention. Generally speaking, trailer vehicle body 10 is connected in well-known manner by a fifth wheel 11 to a prime mover or tractor 12. Vehicle body 10 includes jack leg supports (not shown) for supporting the front end of body 10 when the prime mover 12 is detached therefrom. Vehicle body 10 may be about 33 feet long, 8 feet wide, and capable of carrying a load of approximately 40,000 pounds.

Vehicle body 10 comprises a body frame structure 14 including longitudinally extending box section frame members 15 along sides of the body. Frame members 15 are interconnected transversely by a plurality of transverse beams 16 of I section having their ends secured to longitudinal frame members 15 by gusset plates 17.

At the rear of body 10 a four-wheel truck generally indicated at 20 is supported in well known manner from a truck mounting frame means including transverse truss type beams 21 secured by gussets 22 to frame members 15 and providing space beneath the transverse beams 16 for passage of the bottom lay of the belt means. The frame structure also includes longitudinally extending horizontal fenders 23 for wheels of the wheel frame. Fenders 23 may be connected to a transverse downwardly and rearwardly inclined plate 24 serving as a protection apron or skirt for the rear wheels of the vehicle body.

At the front end of the vehicle body the frame structure may include a suitable arrangement of structural members generally indicated at 26 providing necessary support for pin 27 of the fifth wheel assembly 11.

Centrally of the vehicle body the frame structure is provided with a depending frame means generally indicated at 29 comprising longitudinally spaced vertical members 30 including intermediate vertical members 31 (FIG. 6) which are interconnected by longitudinally extending frame elements 32, 33, transverse members 34 and diagonal bracing members 35. The frame means is arranged to support drive means for the endless belt means as later described. The ends and sides of the frame means may be suitably covered by removable or raisable side and end plates 36 and 37 to house drive means for protection against loose material and objects on a road or surface over which the vehicle is traveling.

It is important to note that the framing at the rear end of the vehicle body and at the four-wheel truck is connected to the adjacent end of the depending frame means 29 by means of a centrally located longitudinally extending compression member 39 of box section. Compression member 39 rigidly connects the four-wheel truck frame and the depending central frame means for stiffening the rear portion of the frame structure which is subjected to compressive forces of great magnitude during unloading of the vehicle body as later described.

Vehicle body 10 also comprises a floor 41 supported upon the transverse members 16 and may comprise longitudinally extending tongue and groove wood boards of suitable thickness. Vertical side walls 42 of metal sheet material are reinforced and supported by exterior vertical members 43 of suitable section such as box section. The vertical walls 42 present an uninterrupted smooth metal surface on the interior of the vehicle body. When the body is designed for hauling trash, it is preferable that the horizontally spaced vertical walls 42 diverge in the direction of the rear of the vehicle body, such divergence of the side walls being emphasized in FIG. 2. The diverging outwardly flaring side walls permit movement of the load carried by the body toward the rear or discharge end of vehicle body without binding and avoiding possible compaction of the material. It should be noted that the joint between the side walls and the floor is a plain right angle joint.

A front wall 45 extends across the front of the body 10 and between the front ends of the side walls 42. Front wall 45 is provided with an interior deflector plate 46 which is downwardly and rearwardly inclined to a transverse horizontal line spaced a selected distance above the floor 41 to permit passage beneath said deflector plate of top lays of the endless belt means. The interior surface of the front wall 45 and the deflector plate 46 are also smooth and uninterrupted to prevent interference with material being hauled.

On the floor 41 of the vehicle body 10 is secured a sheet of material such as a cement-asbestos composition board 48 which presents a top surface 49 having anti-friction characteristics with respect to the endless belt means. Sheet 48 extends transversely to the side walls and for the entire length of the vehicle body. The sheet of cement-asbestos material is also resistant to different materials being hauled, is weather resistant, and is capable along with the metal side surfaces of the front end side walls of being readily flushed and cleaned with a high pressure fluid such as water or steam. An example of a suitable sheet cement-asbestos board is made and sold under the name Cemasbestos by John-Manville Corporation.

Endless belt means generally indicated at 51 may comprise a set of twin endless belt means 52 and 52' which substantially cover the board 49 and which are spaced slightly from side walls 42 and are spaced from each other along the center line of the vehicle body as at 53. The top lays 54, 54' are guided along parallel longitudinal paths by center and side guide blocks 55 and 56 secured to the floor at the rear end of the vehicle body and by corresponding guide blocks 57 and 58 at the front end of the vehicle body. The front guide blocks 57 and 58 are located beneath the deflector wall 46. Each of the guide blocks may be made of a solid rectangular metal plate having a thickness approximately the thickness of the endless belts 52, 52'. A relatively loose tolerance is provided between the guide blocks 55, 56 and the side edges of the belt means 52, 52'.

Each endless belt 52, 52' may be made of a reinforced neoprene material which is resistant to the various types of waste material being hauled. The bottom surface of the endless belt 52 is smooth and has little frictional affinity for the top smooth surface of the cement-asbestos board 49. Such a neoprene reinforced belt may be reinforced by metal or high tensile strength filaments embedded longitudinally in the neoprene. Ends of each neoprene belt 52, 52' may be preferably releasably coupled together to form the endless belt means by means of suitable hinge and pin coupling connectors. A releasable coupling is desirable in the event an endless belt means becomes damaged or must be replaced.

The top lays 54, 54' of the endless belts 52, 52' are supported by the top surface of the cement-asbestos board 48 and also by end idle rollers provided at opposite ends of the vehicle body 10. At the rear of body 10 idle rolls 60 and 60' are supported on a common shaft with a spacer idle roll 61 therebetween. Ends of the common shaft 62 are supported in suitable bearing means 63 secured to upstanding posts 64.

At the front end of the vehicle body similar idle rolls 65, 65' are supported from a common shaft 66 having its ends in suitable bearings means carried by the frame structure in similar manner (not shown). Idle rolls 60, 60'; 65, 65' may be of a sufficient diameter so that the bottom lays 68, 68' will be guided into a path immediately below and parallel to the bottom surfaces of transverse frame members 16. As best seen in FIG. 1, idle rolls 60 and 60' extend rearwardly from the rear edge of floor 41 and project over the protective apron 24 so that material leaving the endless belt means 51 will fall rearwardly of the rear vehicle wheels.

Drive means for the endless belt means 51 is generally indicated at 70, FIG. 5 and may comprise sets of drive roller means 71, 71' for endless belts 52, 52' respectively. The sets of drive roller means 71, 71' are longitudinally offset and disposed on opposite sides of the longitudinal center line of the vehicle body as indicated in FIG. 2. The sets of drive roller means 71, 71' are enclosed within the side and end plates 36 and 37 of the depending frame means 29. Each set of drive roller means 71, 71' is substantially the same and only one set will be described in detail.

In FIG. 6 bottom lay 68' of the endless belt 52' is passed into the depending frame means 29 in a plane just below the bottom of transverse members 17. Bottom lay 68' is passed over a pair of horizontally spaced top drive rolls 73' which are supported on roll shafts 74' having ends mounted in inboard (not shown) and outboard bearing means 75'. Each bearing means 75' is carried by a horizontal frame member 33 in a horizontal slot 76' along which bearing means 75' is horizontally and longitudinally slidably movable by threaded adjustment means 77' including a threaded shaft 78 having threaded engagement with a block 79 welded to the web of frame member 33. Threaded shaft 78 is rotatably mounted in the housing of bearing means 75' and a lock nut 80 is provided for retaining a selected position of top drive roll 73' in spaced relation to the other top roll 73'.

A third drive roll 81' is carried on a shaft 82' mounted at opposite ends in inboard (not shown) and outboard bearing means 83' which are slidably adjustable in vertical frame members 84 which extend between bottom frame members 32 and horizontal members 33. Adjustment means for vertically positioning drive roll 81' comprises a threaded shaft 85 havng threaded engagement with a threaded block 86 welded to the web of vertical member 84. Lock nuts 87 are provided for retaining the third drive roll 81' in selected position below and between the pair of top spaced drive rolls 73'. It will be understood that the inboard ends of rolls 73' and 81' and their respective shafts 74' and 82' are mounted in similar frame means and adjustment means as that shown in FIG. 6.

Drive rolls 73', 81' may be of the same diameter and provided with a cylindrical surface, such as rubber composition for enhanced frictional engagement with bottom lay 68' of the belt 52'.

It is important to note that the pair of horizontally spaced drive rollers 73' are spaced apart a distance less than the diameter of the bottom drive roller 81'. This spacing arrangement provides a frictional driving contact of the surface of the endless belt 52' with the surface 89' of each top drive roller 73' over an arc greater than 90°. In similar manner, the drive roller 81' has driving engagement at 90' with the surface of the belt means 60' over a surface area of the drive roller 81' of a subtended arc greater than 180°. Maximum driving frictional engagement between the drive rollers 73', 81' with the endless belt 68' is thus provided.

It will also be noted that the tension imposed upon the endless belt 68' is adjustable by adjustably positioning the third drive roller 81' in its vertical relationship with the set of horizontal spaced rollers 73'. In view of the heavy loads imposed upon the top lay of the belt means and the degree of frictional contact between the top lay and the board 48, it will be readily apparent that the tension imposed on the bottom lay which extends between drive roller 73' and the rear end idle end rollers 60' imparts a large compressive force between the depending frame means 29 and the frame structure at the rear of the vehicle body. Deflection of the rear portion of the vehicle body which might result from such tensile forces is resisted by compression member 39 extending between the depending frame means 29 and the transverse members 21.

Each of the sets of drive roll 71, 71' have their inboard ends of their roller shafts extended for carrying respective drive sprockets 92, 92' for roll 73, 73' and sprocket 93, 93' for third roll 81, 81' (FIG. 4). A drive chain 94 is passed around said sprockets in a manner similar to the passing of the endless belt for driving said sprockets in the same direction of movement of said endless belt and to positively drive each of said drive rollers in unison to impart to the endless belt an effective driving force sufficient to overcome initial start up friction between the loaded top belt lays and anti-friction surface 49 of board 48, and to then move the endless belts at a selected uniform speed.

The sets of drive rollers 71, 71' are driven from a single motor means 96 carried on a horizontal frame member of depending frame means 29. Motor means 96 may be a constant speed motor of relatively small horsepower, such as 9 or 10 horsepower at 3,000 RPM. A speed reduction system is driven by the motor means 96 in such a manner that both belts will be moved at the same speed under load conditions.

In the present example, exemplary gear ratios are given, it being introduced that they may be modified depending upon the payload to be moved by the endless belt means. Motor 96 is connected by drive chain 97 to gear reduction means 98, the gear ratio between the sprocket at motor 96 to the gear reduction means being 4½ to 1. The gear means 98 includes a pair of oppositely disposed driven shafts 99 and 99', endless belt 52 being driven by gear shaft 99 driving the set of drive roll 71, and shaft 99' driving the set of rolls 71' for belt 52'. In the schematic drive means shown in FIG. 5 the speed reduction sprocket and shaft arrangements are necessitated by the longitudinal offsetting of the drive roll sets 71, 71', the space limitations in the depending frame means 29 for driving the roll sets for the endless belts 52, 52' and compactness of the drive means along the longitudinal centerline of the body 10. Gear means 98 may have a reduction ratio of 3½ to 1, output shaft 99 driving a sprocket 100 at a ratio of 16 to 1. Unity ratio is then transmitted through sprockets 101, 102, 103 to sprocket 104 which drives through chain 105 a sprocket 106 at a ratio of 42 to 16. Sprocket 106 is carried on a transverse shaft 107 which carries a sprocket 108 at a gear ratio of 42 to 24. Sprocket 108 drives chain 109 which drives sprocket 110 at a ratio of 48 to 24.

A similar gear reduction is achieved from the output gear means shaft 99' for driving rollers 71' in unison with rollers 71. Gear shaft 99' carries sprocket 112 at a ratio of 16 to 1 and this ratio is transferred in unity through sprockets 113, 114 to sprocket 115 having a ratio of 42 to 16. Sprocket 115 drives through shaft 116, sprocket 117 at a 24 to 42 ratio. Sprocket 117 drives through chain 118, sprocket 119 having a ratio of 48 to 24.

It will thus be apparent that a substantial speed reduction is achieved in parallel from gear means 98 to the drive roll sets 71, 71' and that such drive rolls are driven in unison in a positive manner by the drive chains 94 which engage the sprockets on the end of the drive roll shafts.

Vehicle body 10 may be utilized in several ways. Since it was primarily designed for use as a trash hauling vehicle, its use for such purpose will be first described. Vehicle body 10 may be loaded with solid waste or trash by driving the vehicle body into a pit alongside a trash collection site whereby trash may be pushed into the top of the vehicle body by bulldozer type tractors. Solid waste or trash may also be loaded into the top of the vehicle body by clam buckets which will lift a load into position over the vehicle body and then drop the load through the top of the body. For this purpose the side walls 42 are connected with one central top transverse member 125 and front and end transverse members 126 and 127 respectively. The material loads fall upon the belt means 51 and are prevented from spilling out of the rear end of the vehicle body by means of suitable gates 128 hinged to posts 64. When the load is completed, the trailer may be driven to its selected destination for unloading. Unloading is readily accomplished by opening gates 128 which swing outwardly and away from the material and then slowly driving the vehicle forwardly while the belt drive means drive the belt means 51 with the top lay moving in a rearward direction to discharge the load over the idle rollers 61. The top lay of belt means 51 may be moved by the drive means at a rate of approximately 2 feet per minute. Since trash material is in essentially bulk form, after opening gates 128 and commencing to unload the trash material, forward movement of the vehicle at a slow rate of speed will spread the trash material along a path and at a selected height or depth. When the belts have positively discharged all of the waste material from the vehicle, the vehicle may be driven to another site where if necessary, the interior of the vehicle can be rapidly flushed with a high pressure fluid such as air or water.

Positive movement of the trash material toward the rear is facilitated by the clean, virtually uninterrupted interior surfaces of the vehicle body. The flat, smooth side walls, the virtually flat floor and the flat conveyor belt thereupon, together with the slightly diverging arrangement of the side walls toward the rear of the body serves to convey and move the material to the discharge end of the body with virtually no interference or interruption. At the discharge end of the body the idle rollers together with the spacer roller therebetween present virtually no separation which might cause interference with the movement of the belt means or the idle rollers. It will be understood that the entire load is normally moved at the same time by the belt means, one half of the load being taken by each belt means 52, 52'.

The interior of the body and the materials used for the belt means and the supporting cement-asbestos board is normally resistant to any chemical reaction with waste materials and deterioration of the load moving belt means and the vehicle body is substantially reduced. Since it may be readily cleaned the chance of contamination between loads if other than trash is to be carried, is also substantially reduced.

It should be noted that the moving means for the material contained in the vehicle body comprises twin belts 52, 52'. If desired, clutch means 130, 130' may be installed on the reduction gear means shafts 99, 99' so that either side or both sides of the drive means may be made operable. If desired, a removable partition may be placed between the belts in the vehicle body and one belt means 52 be employed for hauling one type of material and the other belt means for a different type of material. Such a partition may not be necessary where packaged goods or palleted goods are moved onto the vehicle body along only one of the belt means and occupies space on only one side of the vehicle body.

It will be understood that the endless belt means 51 may be reversed with respect to its direction of movement so that the top lay will move towards the front of the vehicle to facilitate loading of packages. In such a loading operation the speed of the top lay in its forward movement may be correlated to a feed conveyor device carrying the packages to the end of the vehicle for transfer to the top lay of the belt. Unloading of such packaged material may be accomplished by reversing the movement of the top lay so that the packaged material moves toward the rear of the vehicle and onto suitable conveyor means for transporting the material from the end of the vehicle.

It will be understood that a large vehicle body equipped with endless belt means and drive means as described above may be utilized for many different purposes other than hauling trash or solid waste material. It will be understood that various modifications and changes may be made in the vehicle body, drive means, endless belt means, and choice of material for the cement-asbestos board which come within the spirit of this invention and all such changes and modifications coming within the scope of the appended claims are embraced thereby.

I claim:

1. In a vehicle for hauling trash and solid waste material, the combination of:
    a vehicle body including a body frame structure, an uninterrupted floor on said structure, and upstanding side walls;
    a continuous uninterrupted sheet of anti-friction material secured to and substantially completely covering said floor and presenting a smooth top surface from side wall to side wall;
    said anti-friction material being non-reactive to trash and waste material to be hauled;

an endless belt means of reinforced neoprene material having a top lay slidably movable along and supported on the major portion of the top surface of said anti-friction material and having a bottom lay movable beneath said floor;

idle rollers at opposite ends of the floor for supporting said endless belt means in non-driving engagement;

said body frame structure including depending frame means centrally between ends of said body frame structure for supporting belt drive means;

and drive means for said belt means supported by said depending central frame means below said floor and including a pair of spaced drive rollers having surfaces frictionally engaging said bottom lay and with their axes lying in the same plane and parallel to the plane of the bottom lay, a third drive roller below and between said pair of drive rollers and over which said bottom lay has frictional contact for more than 180° about the axis thereof, a motor means carried by said depending frame means for said drive means, means for driving each of said drive rollers, and reduction gear means carried by said depending frame means connecting said motor means and said means for driving said drive rollers.

2. In a vehicle as claimed in claim 1 wherein said sheet of anti-friction material consists of a sheet of cement-asbestos material.

3. In a vehicle as stated in claim 1 wherein said endless belt means includes at least two endless belts in side by side relation, said drive means for said belt means including a set of three driven rollers carried by said depending central frame means for each endless belt, said motor means comprising a single motor for selectively driving both of said endless belts through said reduction gear means.

4. In a vehicle for hauling trash and solid waste material, the combination of:

a vehicle body including a body frame structure, an uninterrupted floor on said structure, and upstanding side walls;

a continuous uninterrupted sheet of anti-friction material secured to and substantially completely covering said floor and presenting a smooth top surface from side wall to side wall;

said anti-friction material being non-reactive to trash and waste material to be hauled;

an endless belt means of reinforced neoprene material having a top lay slidably movable along and supported on the major portion of the top surface of said anti-friction material and having a bottom lay movable beneath said floor;

idle rollers at opposite ends of the floor for supporting said endless belt means in non-driving engagement;

said body frame structure including depending frame means centrally between ends of said body frame structure for supporting belt drive means;

and drive means for said belt means supported by said depending central frame means below said floor and including a pair of spaced drive rollers having surfaces frictionally engaging said bottom lay and with their axes lying in the same plane and parallel to the plane of the bottom lay, a third drive roller below and between said pair of drive rollers and over which said bottom lay has frictional contact for more than 180° about the axis thereof, a motor means carried by said depending frame means for said drive means, means for driving each of said drive rollers, and reduction gear means carried by said depending frame means connecting said motor means and said means for driving said drive rollers;

said body frame structure including side frame members, transverse frame members adjacent the rear of said frame structure, and a longitudinally extending compression member centrally of said side frame members below said bottom lay of said belt means, said compression member extending between a tansverse frame member at one end of said body frame structure and said depending frame means which supports said drive means.

* * * * *